United States Patent [15] 3,699,757
Hulburt [45] Oct. 24, 1972

[54] BELT CARRIED CUTTERS AND MOUNTING MEANS THEREFORE
[72] Inventor: Joseph C. Hulburt, Leola, Pa.
[73] Assignee: Sperry Rand Corporation, New Holland, Pa.
[22] Filed: March 23, 1971
[21] Appl. No.: 127,099

[52] U.S. Cl. ................................................56/291
[51] Int. Cl. ............................................A01d 55/24
[58] Field of Search..................56/244, 245, 290–292

[56] References Cited

UNITED STATES PATENTS 2,782,582   2/1967   McClearen..............56/244 X
3,545,188   12/1970   Locati......................56/245

Primary Examiner—Louis G. Mancene
Assistant Examiner—J. A. Oliff
Attorney—John C. Thompson, Joseph A. Brown and James J. Kennedy

[57] ABSTRACT

An endless belt type cutter assembly for a mower having cutter blades of the impact type connected for swinging movement to outwardly projecting posts carried by the belt at spaced apart intervals. The connection means includes a pin adapted to pass through a hole in the post and to be received by a recessed seat in a portion of the cutter blade.

3 Claims, 7 Drawing Figures

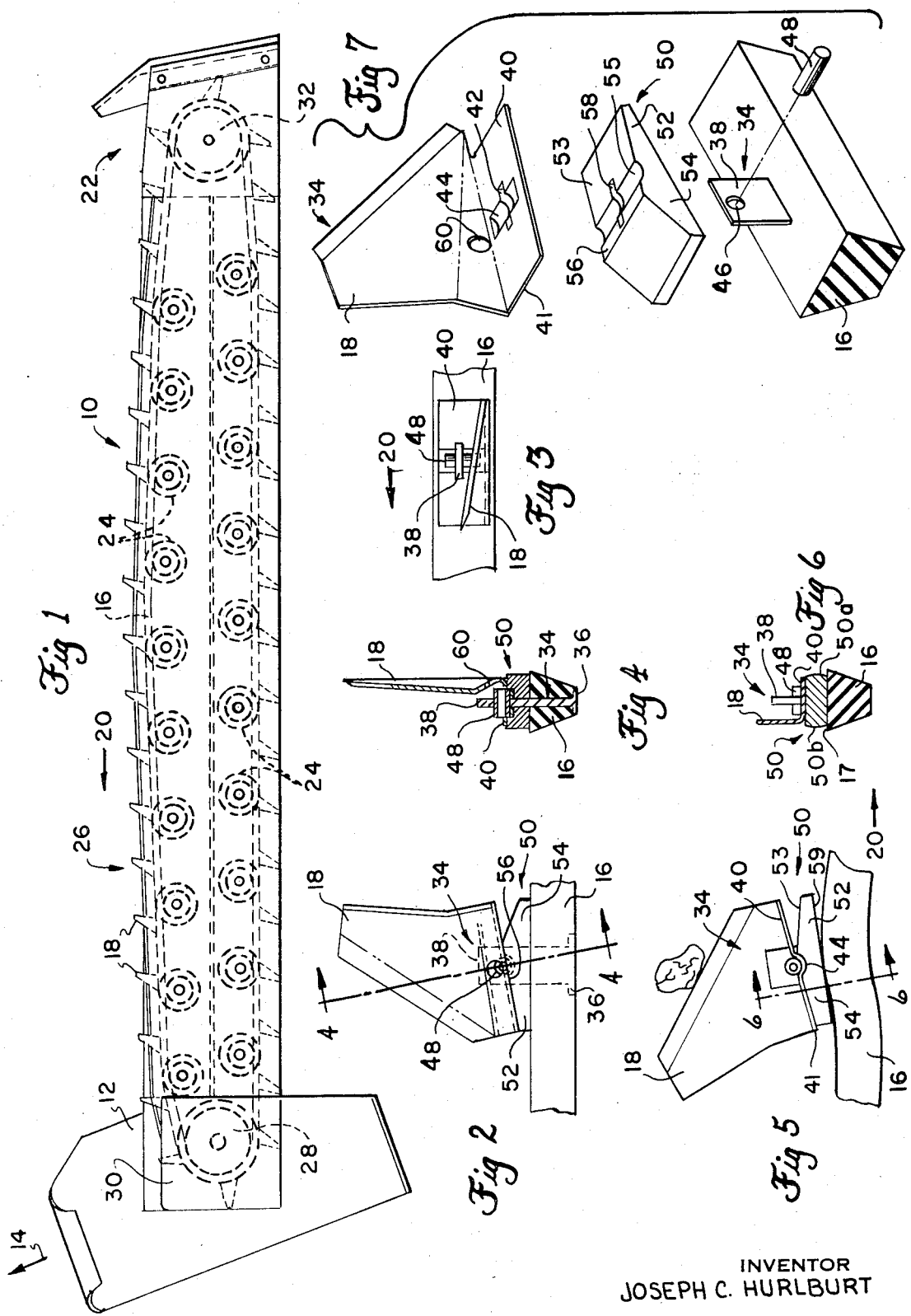

3,699,757

BELT CARRIED CUTTERS AND MOUNTING MEANS THEREFORE

CROSS REFERENCE TO RELATED APPLICATIONS

The present invention is shown in part, but not claimed, in copending U.S. application Ser. No. 66,370 filed Aug. 24, 1970 by Joseph C. Hurlburt and entitled "Cutter Bar for Mower," and copending U.S. application Ser. No. 127,111 filed on even date herewith by J. C. Hurlburt, H. G. McCarty and N. C. Locati and entitled "Blade Mount for Belt Mower."

FIELD OF INVENTION

The present invention relates generally to agricultural machinery and more particularly to an impact mowing device in which a plurality of impact cutters are mounted on an endless flexible member such as a belt.

BACKGROUND OF THE INVENTION

In a mower of the class referred to above the flexible member is arranged with one course thereof disposed forwardly upon the device in such a manner that the impact cutters mounted thereon engage standing stems and stalks of forage crops and the like which are to be cut thereby. A typical type of such device is shown in U.S. Pat. No. 3,545,188 in the name of Locati. If the impact cutters are rigidly mounted on the flexible member substantial difficulties result when such cutters encounter hard objects, such as stones, as well as hillocks, both of which occur frequently in fields mowed by devices of the type to which the present invention pertains. Serious injury sometimes is sustained by said cutters such as being bent, as well as being broken or torn from the mounting thereof upon the flexible member.

The Locati U.S. Pat. No. 3,545,188 also discloses in one embodiment a spring washer disposed between the blade or cutter element and the belt, the washer urging the cutter element into an extended position. When the cutter element impacts a solid object the cutter element folds back behind a guard rail of the cutter bar.

SUMMARY OF INVENTION

It is the principal object of the present invention to provide an endless belt type cutter assembly for a mower or similar harvesting device for agricultural crops in which cutter blades of the impact type are fixed to a belt or other flexible supporting member such as a chain, cable or the like at spaced intervals to project outwardly from one edge of the flexible member, the blades being connected to the flexible member by improved means which readily permit limited deflection of the blades with respect to the endless supporting member without undue wear or with loss of parts.

An object of the present invention is to provide a flanged cutter blade adapted to be pivotally secured to a post carried by an endless flexible member in which the flange is provided with a recess having an outer curved surface when taken longitudinal cross section, the connecting pin means being disposed in surface contact with the curved surface of the recessed portion to provide improved wearing characteristics and prevent accidental loss.

Another object of the present invention is to provide a pivotal mounting construction for a cutter blade wherein the pivotal mounting means may be easily removed.

These and other objects and advantages of this invention are achieved by providing a cutter blade having a flange in which is disposed a recessed seat having a generally cylindrical outer surface when viewed in longitudinal cross section, the connecting pin means being disposed within said seat and in general surface contact with the outer surface thereof. Aperture means are disposed in the cutter blade in outward alignment with said recess and slightly above said recess to facilitate removal of the pin when the resilient supporting means is compressed.

BRIEF DESCRIPTION OF THE DRAWINGS

FIG. 1 is a plan view of an exemplary cutter bar or assembly of the type to which the present invention pertains, this figure, as well as the other figures of the drawings being drawn generally to scale.

FIG. 2 is an enlarged fragmentary plan view of a portion of the endless flexible cutter assembly, showing a blade mounted upon the endless flexible supporting member mounted in the cutter bar shown in FIG. 1 and illustrating connecting means for the blade which embodies principles of the present invention.

FIG. 3 is an end view of the cutter shown in FIG. 2, the same being mounted on a fragmentarily illustrated portion of the endless flexible supporting member therefor.

FIG. 4 is a vertical sectional view of a fragmentarily illustrated cutter means shown in FIG. 2 as seen on the Lines 4—4 of said figure.

FIG. 5 is a vertical sectional view of a fragmentarily illustrated cutter means in which the cutter is shown in a deflected position.

FIG. 6 is a transverse sectional view taken generally along the Lines 6—6 in FIG. 5.

FIG. 7 is an exploded isometric view of the connecting means.

DESCRIPTION OF THE PREFERRED EMBODIMENTS

Referring to FIG. 1, a cutter bar unit or assembly 10 is shown which comprises a frame of rigid nature supportably connected at one end, for example, to a mower shoe 12, which is arranged, for example, to be moved in the direction of the arrow 14. Such illustration is intended to be illustrative rather than of a restrictive nature, however. Also, the cutter bar unit 10 may be of the type employed on a tractor for mowing hay or the like, or the same may be part of any one of a number of agricultural machines used in harvesting and otherwise processing various kinds of forage crops and the like.

The cutter bar unit 10 includes an endless flexible supporting member 16, which, as shown in the various figures of the drawing, comprises a flexible V-belt. The principal purpose thereof is to support the cutter blades 18 in spaced relationship with respect to each other and move the same, usually at a relatively high linear speed, in cutting direction, which is that which is illustrated by the arrows 20 in FIGS. 1 and 5.

The opposite end of the cutter bar unit 10 from that which is connected to the mower shoe 12 is provided with an end shield 22. Said unit also supports a plurality of idler pulleys 24, along which opposite, substantially parallel courses of the endless flexible member 16 extend, the course nearest the upper edge of the sheet in FIG. 1 representing the forward, operative edge 26 of the cutter bar unit 10. Said unit also includes a drive sheave 28 driven by a gear box 30, which is connectable to a tractor, p.t.o. of another type of agricultural implement, or otherwise, to derive power therefrom. The endless flexible member 16 extends around another idler sheave 32 at the outer end of the unit 10. The foregoing description primarily is to afford an illustration of the basic structure to which the present invention pertains.

The cutter blades 18 are connected to the endless flexible supporting member 16 by a compound type of connecting means. Each compound connecting means comprises a plurality of related elements affording a pivotal connection of each blade 18 to the supporting member 16. Said elements include what is termed a post or T-connector, indicated generally at 34, which has an appropriate head 36 on the inner end which engages the flexible supporting member 16 in such manner as to prevent outward movement of the opposite end 38 of the post from the member 16. Each blade also is provided with a laterally extending flange 40, which has an opening or slot 42 therein through which the opposite end 38 of post 34 extends, said slot preferably being slightly longer than the width of the post 38 so as to permit limited pivotal movement of the cutter blades with respect to the posts. As can best be seen from FIG. 6 the flange 40 is generally parallel in transverse section to the outer surface 17 of the belt.

Each flange 40 has an arcuate seat 44 pressed thereinto, such seat being shorter than the entire width of the flange 40 as is best shown in FIG. 7. Said seat is readily formed in the flange 40 by a stamping or pressing operation, especially prior to said cutter blades being tempered.

Each of the posts 34, intermediately of the ends thereof, is also provided with a hole 46, best shown in FIG. 7, through which a solid or tubular pivot pin 48 extends transversely with close tolerance relative to said hole 46.

A wedge-shaped yieldable or compressible member, indicated generally at 50, is disposed between and in resilient contact with the flange 40 of each cutter blade 18 and the outer face 17 of supporting member 16. The member 50 is of a special shape having portions 52 and 54 disposed forwardly and rearwardly, respectively, of a recess 55 which is adapted to receive seat 44 of the flange 40. The trailing portion 54 has a short portion with an upper surface 56 which lies in the same plane as the upper surface 53 (FIG. 7) of the forward portion 52. The compressible member 50 is preferably made of molded rubber or urethane. As it is well known in the art, the compressibility of the rubber or urethane block can be varied by changing the formulation of material and the actual formulation is to a limited extent a matter of choice. However, it is necessary that the block is sufficiently firm to hold the knife firmly in its normal working position, and also firm enough to prevent the rear edge 41 of the knife from contacting the upper surface of the belt when the knife pivots away from its leading edge after encountering a hard object as shown in FIG. 5. It is also necessary that the member 50 is sufficiently yieldable to permit the knife to swing rearwardly after encountering a hard object, the rearward swinging of the knife compressing the portion under surface 56 of the member 50.

When the blades or knives 18 are mounted upon the belt 16 the block 50 is slightly compressed. Thus, the members 50 are confined between the lower flange 40 of each knife and the upper surface of the belt, the upper surfaces 53 and 56 firmly engaging the flange 40 of the blades to maintain the blades 18 in operative position with respect to the supporting member 16 so that the blades 18 will not yield, except under abnormal conditions, and especially while engaging and cutting stems or stalks of pasture and forage crops which the blades are intended to cut under normal conditions. However, when any of the cutting blades are subjected to shock such as when they encounter a hard object such as a stone, tough hillock, clump of grass, roots or other type of hard or tough object projecting from a field into the path of movement of the cutter blades 18, the blade or blades which are thus subjected to such shock will be permitted to pivotally move a limit amount, in a direction opposite to that in which the assembly of cutter blade is moving in cutting direction, and thereby avoid serious damage either to the blade per se, the supporting member 16, or the means by which the blades are connected to such supporting member.

When the blades 18 are moved from their normal working position, shown in FIG. 2, to their deflected position, shown in FIGS. 5 and 6, as a result of substaining such shock, the short portion underlying surface 56 of said other end portion 54 of the compressible member 50 is compressed by the flange 40 of the blade as can best be seen from FIG. 6. Due, however, to the limited volume of the portion underlying surface 56, no excessive amount of resistance is offered to oppose such pivotal rearward movement of the blade. However, the portion under surface 56 will immediately restore the blade 18 to and normally maintain it in its operative position relative to supporting member 16 after the blade has passed such hard or tough object which caused such deflection. When the portion 56 is compressed the displaced volume of the block 50 flows to the sides 50a, 50b FIG. 6 and the bottom surface 59 does not slide upon the belt. It should also be noted that by employing a rubber or urethane block of the specific shape disclosed high stress areas are minimized, and the block is not likely to fatigue after extended usage.

Each of the compressible members 50 has an opening or slot 58 therein through which the post 38 extends, whereby the member 50 is accurately positioned upon the post by the same. Also the compressible nature of the members 50 aids in connecting the blades 18 to the posts 34 and correspondingly, to the supporting member 16. This is due to the fact that when the blades 18 are assembled with respect to supporting member 16, the compressible member 50 for each blade is first mounted upon the post 34 thereof, following which the upper ends 38 of the posts are each inserted through the slot 42 in each flange 40 of the blades. Each blade and flange is then compressed, by a suitable tool, toward the supporting member 16, such compression being sufficient to dispose the outer edge of the flange 40, which is shown in FIG. 7 and defines one end of the arcuate seat 44, either even with or below the lower edge of hole 46 in the post 34, whereupon the pivot pin 48 may be inserted through hole 46 until the opposite ends thereof are in alignment with the ends of the arcuate seat 44. Then the tool may be released to permit expansion of the compressible member 50, which moves the arcuate seat 44 into position to receive the pivot pin 48 and this completes the connection of the blade 18 to its endless flexible supporting member 16.

When a conventional flexible V-belt comprises the supporting member 16, the same normally is formed from a number of layers of fabric which are sandwiched within a rubber body. Such product also is capable of being compressed a limited distance in a direction transverse to the length thereof and advantage also may be taken of such compressible nature of the same likewise to facilitate the disposition of the arcuate seat 44 in the blade flange 40 so as to receive the pivot pin 48, following which the expansion of the member 16, as well as the compressible member 50, will move the seat into firm engagement with the pivot pin 48.

When it is desirable to replace either a single blade, several blades, or all of the blades, which are connected to the supporting member 16, especially under conditions where the flexible member 16 is still useable but the blades have been worn substantially beyond further use, disconnection of the blades from the flexible supporting member 16 is accomplished by use of the same tool referred to above. Said tool is used to compress the member 50 and/or the supporting member 16 if of compressible nature so as to depress the arcuate seat 44 from engagement of the outer wall thereof with the pivot pin 48 which then may be forced out of the hole 46. Removal of the blade from the post 34 then is quickly accomplished and a new blade may be substituted therefor by reversing such procedure.

In order to facilitate the removal of pin 48 from hole 46, the blade 34 is provided with a hole 60 through which the pin may be forced through when the member 50 and/or supporting member 16 is compressed.

While the invention has been described and illustrated in its several preferred embodiments, it should be understood that the invention is not to be limited to the precise details herein illustrated and described since the same may be carried out in other ways falling within the scope on the invention as illustrated and described.

What is claimed is:

1. A belt mower comprising a cutter bar, a drive sheave mounted on one end of the cutter bar, an idler sheave mounted on the other end of the cutter bar, idler pulleys mounted on the forward and trailing edges of said cutter bar, a cutter belt mounted for driven rotation on the drive and idler sheaves and the idler pulleys, said cutter belt having a plurality of outwardly extending transversely apertured posts mounted thereon, a plurality of cutter blades mounted on said plurality of posts, each of said cutter blades including a transversely extending flange generally parallel in transverse section to the outer surface of said belt, said transversely extending flange having a transversely extending recessed seat disposed between the longitudinal edges of said flange, resilient means disposed between and in resilient contact with the outer surface of said belt and the transversely extending flange, and a plurality of cylindrical pins, each of said pins transversely extending through each of said apertured posts and being disposed within one of said seats, said pins pivotally securing said cutter blades to said posts, and said recessed seats holding said pins from displacement during cutting.

2. The belt mower set forth in claim 1 in which the outer surface of said recessed seat in the transversely extending flange is generally cylindrical and extends in a transverse direction, the radius of curvature of said recessed seat being not less than the radius of curvature of said pins.

3. The belt mower set forth in claim 1 in which an aperture is provided in said cutter blade in outward alignment with said seat and above said seat.

* * * * *